March 19, 1957 A. MAYER 2,785,530

DISK TIME INDICATING DEVICE

Filed March 28, 1955 2 Sheets-Sheet 1

INVENTOR.
ARTHUR MAYER
BY
Mock + Blum
ATTORNEYS

March 19, 1957 A. MAYER 2,785,530

DISK TIME INDICATING DEVICE

Filed March 28, 1955 2 Sheets-Sheet 2

INVENTOR.
ARTHUR MAYER
BY Mock & Blum
ATTORNEYS 2,785,530

DISK TIME INDICATING DEVICE

Arthur Mayer, Bronx, N. Y.

Application March 28, 1955, Serial No. 497,183

3 Claims. (Cl. 58—126)

My invention relates to a new mechanical movement, which can be used for various purposes.

As one example, the new movement can be used as an indicating or signalling device. Thus, as an improvement on an ordinary hour hand, it can be incorporated in a horologe to indicate the hour.

Without limitation thereto, the invention is explained as embodied in a watch or clock or other time-indicating device, which may be powered by any means.

As embodied in a clock, the device includes two indicating disks of contrasting color. For convenience, they are taken to be black and white in this example.

The indicating disks are identical except for color. Each one has a central hole, and is cut through along a radius from the center to the circumference. Projecting perpendicularly from the reverse face of each disk is a rigidly fixed pin, which abuts the radial cut near the circumference of the disk.

The two disks are interleaved through their respective radial cuts, and are maintained in approximate concentricity with one another by the central shaft of the clock, which passes through their central openings.

The device includes further a thin planar assembly, comprising a stator and a rotor, which is situated immediately behind, and is concealed by, the interleaved indicating disks. In this example the rotor will be assumed fixed to the hour shaft of the clock. Thus the rotor turns continuously within the stator at the rate of two revolutions per day.

The projecting pin of one of the indicating disks is accommodated in a notch in the internal rim of the stator, and the projecting pin of the other indicating disk is accommodated in a notch in the external rim of the rotor. Thus one of the indicating disks remains fixed with the stator, which the other turns with the rotor.

The stator notch is located near the 12 o'clock position, and the rotor notch is nearly in line with the hour hand. Thus the rotor notch passes the stator notch at 12 o'clock.

In this example, soon after midnight the pin of the black indicating disk is in the stator notch, and the pin of the white indicating disk is in the rotor notch. As viewed from the front, the entire white disk is behind the black disk, except for a small sector which is in front of the black disk. One of the boundaries of the sector is formed by the exposed edge of the radial cut in the black disk, and is in line with 12 o'clock, while the other boundary of the sector is formed by the exposed edge of the radial cut in the white disk, and is in line with the hour hand.

As the white disk turns with the rotor, its exposed radial edge advances over the black disk, and the white sector becomes larger. Before noon the entire black disk is between the white disk, except for a small sector which remains in front of the white disk.

As the rotor notch passes the stator notch at noon the two pins automatically exchange places, so that the white disk becomes stationary and the black disk moves with the rotor. Thus from noon to midnight the black sector becomes larger until, before midnight, the white disk is again almost entirely behind the black disk. As the rotor notch passes the stator notch at midnight, the two pins again exchange places automatically, and the cycle is completed.

The two pins exchange places whenever the two notches pass each other, and this is so regardless of the direction of rotation.

The invention is further explained in the annexed description and drawings.

Figures 1, 2, 3, 4:
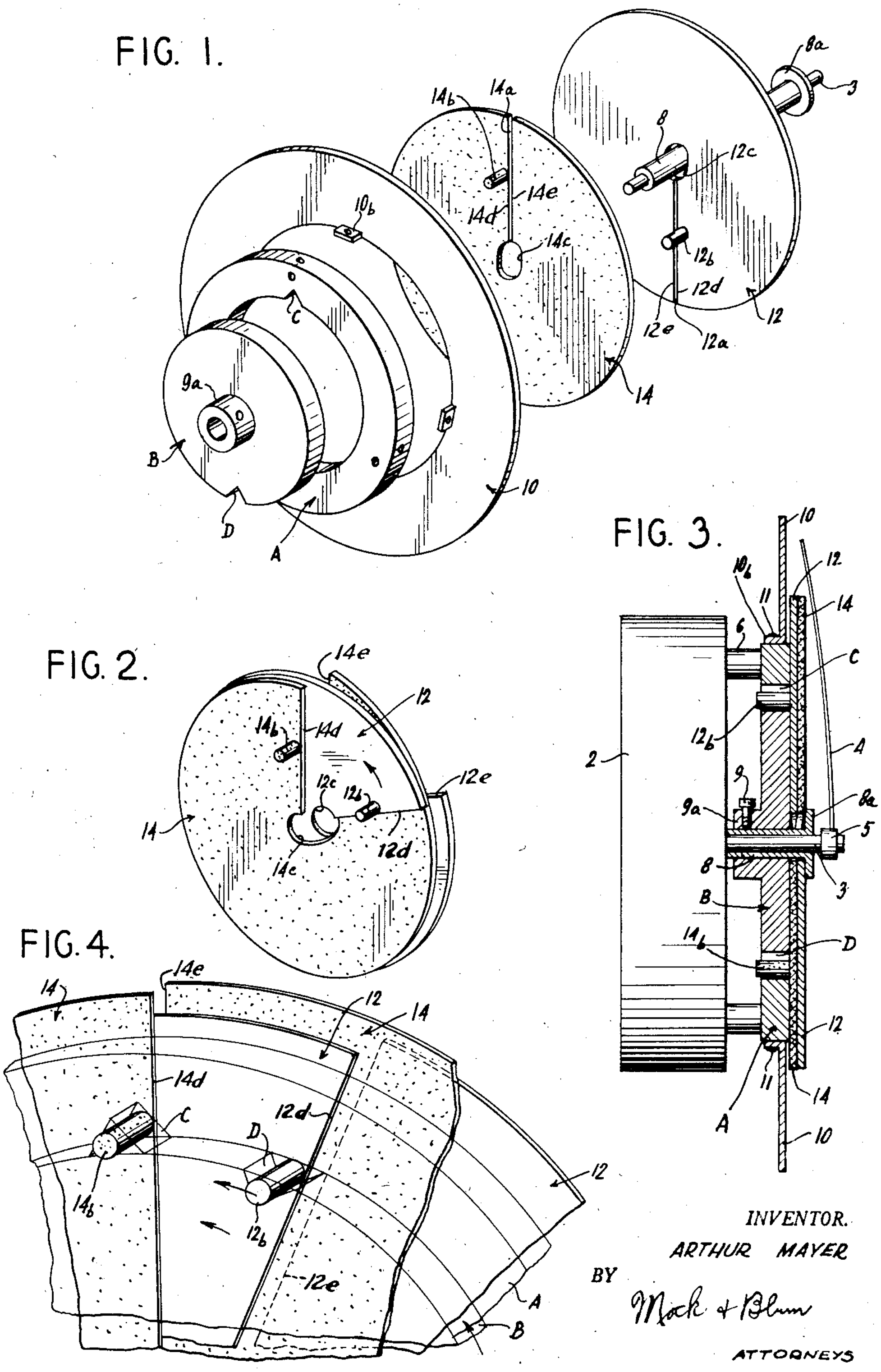
Fig. 1 is a rear perspective view of the essential parts of the device.
Fig. 2 is a rear perspective view of the two indicating disks, showing how they are interleaved.
Fig. 3 is a section on the line 3—3 of Fig. 9.
Fig. 4 is an enlarged rear perspective view of a portion of the indicating discs and stator and rotor, in position to indicate about 10:00 A. M.

The device comprises a casing 2, with hollow posts 6 extending therefrom. Fastening members 7 extend through the hollow posts 6, and fix a stator A to the casing 2. Stator A is a flat ring, and bears in its internal surface a V-shaped stator notch C.

A hollow shaft 8 is turnably mounted in casing 2. A shaft 3 is turnably mounted in the hollow shaft 8, and a minute hand 4 has a hub 5 which is fixed to shaft 3.

A rotor B is mounted on hollow shaft 8 by means of a hub 9a and set screw 9. Hence rotor B is revolved in unison with shaft 8. Rotor B fits freely, but with close tolerance, within stator A. The outer cylindrical periphery of rotor B bears a V-shaped rotor notch D.

For both the stator notch and the rotor notch the angle of the V is roughly 90°. Both notches are as small as possible, consistent with a free and easy fit for either of the pins **12*b* or 14*b***.

The mechanism for rotating shaft 3 and shaft 8 is not shown, as it is conventional in any clock or watch. Shaft 3 is the minute shaft, and shaft 8 is the hour shaft.

A white indicating disk 12 and a black indicating disk 14 are made of some thin resilient material, which may be metal or plastic or anything that is even slightly springy. Since the indicating disks 12 and 14 are identical except for color, only disk 12 will be described below.

Disk 12 has a central opening **12*c* from which there extends a radial slit 12*a* to the outer periphery of the disk. A cylindrical pin 12*b* is fixed to the reverse face of disk 12 at a radius equal to the radius of the rotor B. Said pin 12*b* is perpendicular to the plane of disk 12, and is close to the radial slit 12*a*. The edge of slit 12*a* which is proximate to pin 12*b* is designated by the reference character 12*d*. The edge of slit 12*a* which is remote from pin 12b is designated by the reference character 12e. As viewed from the rear, as in Figs. 1, 2, and 4, the pin 12b is at the counter-clockwise side of the slit 12a**.

The central opening 12c is large enough to permit the disk 12 to be mounted freely upon the shaft 8, and is also elongated in the direction of the pin 12b. Thus a small translation of the disk 12 is permitted, and the pin 12b may fit easily into either the stator notch C or the rotor notch D.

Similarly to disk 12, disk 14 is provided with elongated opening 14c, with radial slit 14a having edges 14d and 14e and with pin 14b fixed thereto adjacent slit edge 14d.

The two indicating disks 12 and 14 are interleaved, as in Fig. 2, before they are mounted on the shaft 8.

A section of the assembled device is shown in Fig. 3. The pin 12b is accommodated in the stator notch C, and the pin 14b is accommodated in the rotor notch D. Therefore, the white indicating disk 12 is fixed with the stator A, and the black indicating disk 14 turns with the rotor B. The collar 8a on the shaft 8 is larger than either of the openings 12c or 14c, and therefore keeps the indicating disks 12 and 14 in place.

In Fig. 4 it is the white disk 12 that turns with the rotor B. The direction of rotation is indicated by arrows. Since this is a rear view, rotation is counter-clockwise. The rotation of the rotor B is communicated through the rotor notch D and the pin 12b to the white disk 12. Hence the two edges 12d and 12e of slot 12a turn with the rotor B. As seen from the front, the edge 12d, which is next to the pin 12b, is always hidden behind the black disk 14. Similarly, the edge 14d of the slot 14a is always hidden behind the white disk 12. On the other hand, the edges 12e and 14e are always visible from the front.

Figures 5, 6, 7, 8, 9, 10, 11, 12, 13, 14, 15:
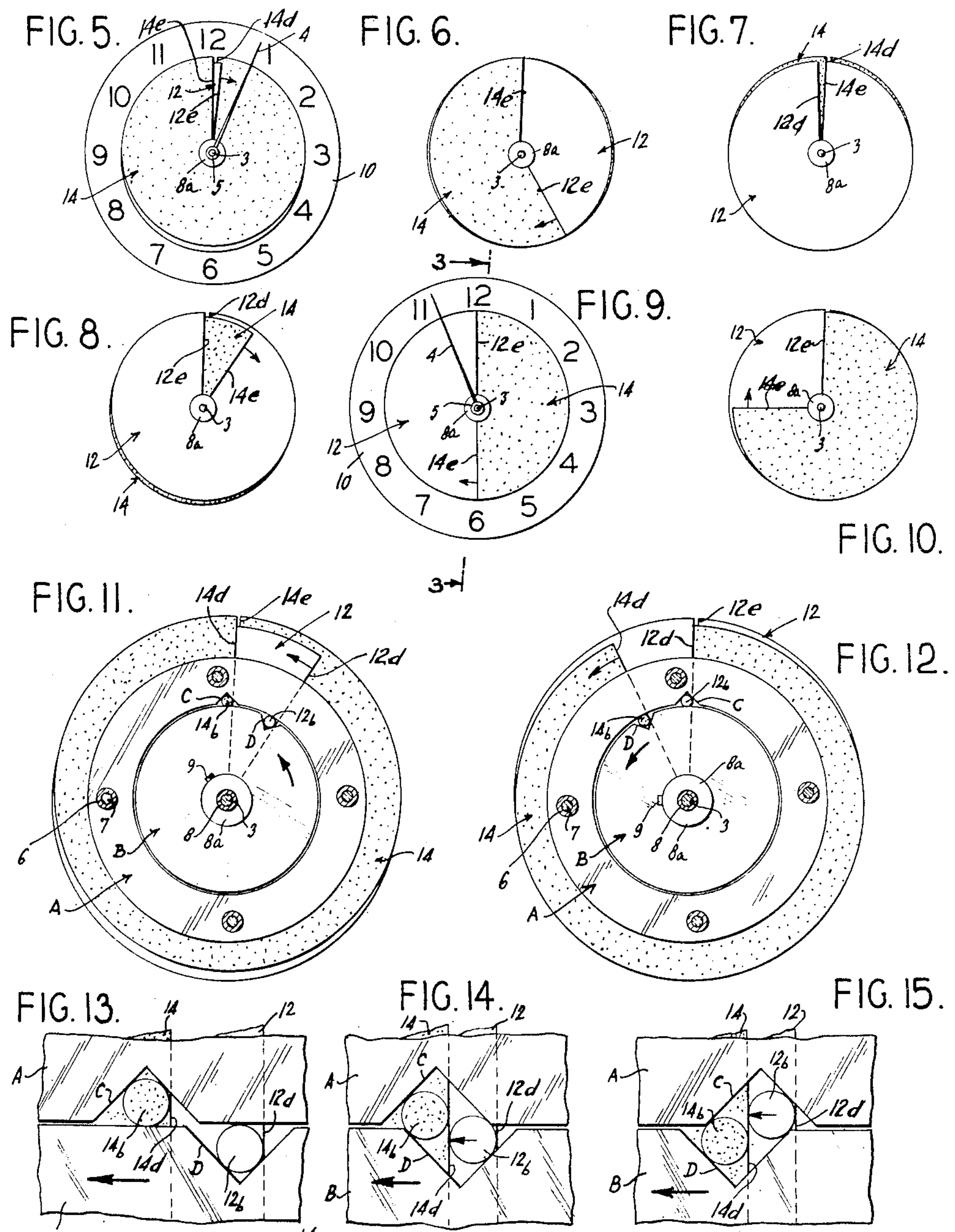
Fig. 5 is a front elevation of the indicating disks, showing the positions of said disks soon after midnight.
Fig. 6 is a front elevation of the indicating disks at about 5 A. M.
Fig. 7 is a front elevation of the indicating disks, showing the positions of said disks soon after noon.
Fig. 8 is a front elevation of the indicating disks at about 1 P. M.
Fig. 9 is a front elevation of the indicating disks at 6 P. M.
Fig. 10 is a front elevation of the indicating disks at 9 P. M.
Fig. 11 is a rear elevation of the indicating disks and the stator and rotor about an hour before noon.
Fig. 12 is a rear elevation of the indicating disks and the stator and rotor about an hour after noon, corresponding to Fig. 8.
Figs. 13–16 are a sequence of diagrammatic views, which illustrates how the pins exchange places at 12 o'clock.
Figure 16:
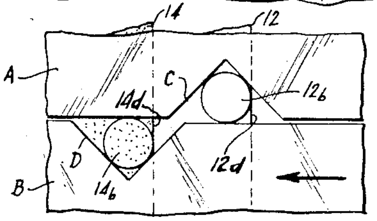

From midnight to noon the edge 12e moves in synchronism with the hour hand, while the edge 14e remains stationary, as shown in Figs. 5–7. From noon to midnight the edge 14e moves in synchronism with the hour hand, while the edge 12e remains stationary, as shown in Figs. 8–10.

What happens at 12 o'clock is shown in the series of diagrams, Figs. 13–16. The curvature of rotor and stator are non-essential to the operation of the pin-exchange mechanism, and so the motion is depicted as linear.

The rotor B moves to the left and, as in Fig. 13, carries the pin 12b with it in the rotor notch D until the pin 12b meets the edge 14d. As the rotor notch D continues to the left, the pin 12b pushes on the edge 14d, and thereby moves the pin 14b, which is forced downward by the sloping side of the stator notch C. The pin 12b, for its part, is retarded, and is forced upward by the sloping side of the rotor notch D. Finally, the pin 12b is left in the stator notch C, while the pin 14b is carried along by the rotor notch D.

Twelve hours later, the rotor notch D, still moving to the left, again approaches the stator notch C from the right. This time, however, it carries with it pin 14b, which pushes on the edge 12d to effect the exchange of pins.

If the direction of motion of the rotor B is reversed, the mechanism operates in much the same way.

The principles disclosed here may be employed to construct a device with three or more interleaved indicating disks. This requires more than one stator notch, or more than one rotor notch, and the uninterrupted angle of rotation of any one disk will be less than 360°.

The same principles may also be employed in a device wherein linear motion, instead of rotational motion, is provided.

I claim:

1. A mechanism which includes a flat circular rotor closely encircled about its periphery by an annular stator, said rotor having a V-shaped rotor notch in its periphery, said stator having a V-shaped stator notch in its internal periphery, a shaft fixed to said rotor and extending perpendicularly therethrough, said shaft being concentric with the circular periphery of said rotor, means for producing rotation of said rotor relative to said stator, a first disk having a central opening therethrough, said disk having a slit cut therethough along a radius, said slit extending from said central opening to the periphery of said disk, a cylindrical pin projecting perpendicularly from one face of said disk, said pin being rigidly fixed to said face near said slit and at a distance from the center of said disk equal to the radius of the aforementioned rotor, a second disk and pin similar to said first disk and pin, said first disk and said second disk being interleaved through their respective slits and lying flat against each other with their central openings in coincidence and with their pins projecting in the same direction, means on said shaft holding said disks flat against said stator and rotor, said shaft extending through said central openings of said disks, the pin of one of said disks being contained in said stator notch and the pin of the other of said disks being contained in said rotor notch, said pins being forced to exchange places with each other at each passage of said stator notch by said rotor notch, the entire mechanism alternating therefore between a first condition in which said first disk is constrained to rotate with said rotor while said second disk is fixed to said stator and a second condition in which said second disk is constrained to rotate with said rotor while said first disk is fixed to said stator, the transition from the one of said conditions to the other of said conditions occurring whenever said rotor notch passes said stator notch.

2. A mechanism comprising a shaft, a cylindrical rotor fixedly mounted on said shaft and having a V-shaped rotor notch in its periphery, an annular stator closely encircling the periphery of said rotor and having a V-shaped stator notch in its internal periphery, means for turning said shaft to produce rotation of said rotor relative to said stator, a pair of identical flexible and resilient disks having respective central openings through which said shaft extends turnably, each said disk having a slit extending from its central opening, radially to the periphery thereof, said central opening being elongated in the direction of length of said slit so as to permit slight radial movement of each said disk in the radial direction of said slit, said disks being interleaved through their respective slits, each said disk having a pin projecting from a face thereof with one of said pins being positioned and adapted to be located within the rotor notch and the other of said pins being positioned and adapted to be located within the stator notch, the pin of each disk being positioned next to the slit thereof and trailing same in the sense of the direction of rotation of said rotor, said disks being radially movable in respective directions and to an extent sufficient to permit interchange of said pins within the respective notches, the disk pin located in said rotor notch being adapted upon turning of said shaft to bear against the slit edge of the other disk which is proximate to the pin thereof so as to urge the latter mentioned pin cammingly against the surface of the stator notch and hence into the rotor notch, the surface of said rotor notch which is remote from said surface of the stator notch being adapted simultaneously to act cammingly upon the pin in said rotor notch and force it into said stator notch for interchange of said pins between said notches.

3. A mechanism comprising a first rigid member having a first surface and having a first smooth-sided, V-shaped notch in said first surface, a second rigid member having a second smooth surface and having a second smooth-sided, V-shaped notch in said second surface, means mounting said first member and said second member with said first surface and said second surface opposing and closely spaced from each other, said second member being movable relative to said first surface in a direction maintaining the close spacing of said first surface and said second surface, means for producing such motion of said second member relative to said first member so that said second notch passes said first notch, the axes of said notches being parallel to each other and perpendicular to the direction of said motion, a first plate having a first abutment edge and a second plate having a second abutment edge, a first pin fixed to said first plate adjacent said first abutment edge, a second pin fixed to said second plate adjacent said second abutment edge, means movably mounting said plates adjacent the side of said first and second members, said first pin being releasably located within said first notch and extending perpendicular to the direction of said motion, said second pin being releasably located in said second notch and extending perpendicular to the direction of said motion, said abutment edges respectively extending in a direction perpendicular to both the axes of said pins and the direction of motion of said second member, said second pin being adapted upon movement of said second member to bear against said first abutment edge so as to urge said first pin cammingly against the surface of said first notch and hence into said second notch, the surface of said second notch which is remote from said surface of said first notch being adapted simultaneously to act cammingly upon said second pin and force it into said first notch for interchange of said pins between said notches.

References Cited in the file of this patent

UNITED STATES PATENTS 2,011,517 Geoffrion -------------- Aug. 13, 1935